(12) United States Patent
Cohen et al.

(10) Patent No.: US 10,104,845 B2
(45) Date of Patent: Oct. 23, 2018

(54) HYDROPHONIC PLANTER

(71) Applicant: EZinGrow Ltd., Netanya (IL)

(72) Inventors: Tomer Cohen, Herzliya (IL); Amir Kariv, Netanya (IL)

(73) Assignee: EZinGrow Ltd., Netanya (IL)

( * ) Notice: Subject to any disclaimer, the term of this patent is extended or adjusted under 35 U.S.C. 154(b) by 183 days.

(21) Appl. No.: 15/168,278

(22) Filed: May 31, 2016

(65) Prior Publication Data

US 2016/0345517 A1 Dec. 1, 2016

Related U.S. Application Data

(60) Provisional application No. 62/168,823, filed on May 31, 2015.

(51) Int. Cl.
| | | |
|---|---|---|
| *A01K 31/02* | (2006.01) | |
| *A01G 31/02* | (2006.01) | |
| *A01G 7/04* | (2006.01) | |
| *A01G 27/00* | (2006.01) | |

(52) U.S. Cl.
CPC ............ *A01G 31/02* (2013.01); *A01G 7/045* (2013.01); *A01G 27/003* (2013.01); *Y02P 60/146* (2015.11); *Y02P 60/216* (2015.11)

(58) Field of Classification Search
CPC ...... A01G 31/02; A01G 27/02; A01G 27/001; A01G 27/003; A01G 27/005; A01G 27/008

See application file for complete search history.

(56) References Cited

U.S. PATENT DOCUMENTS

| | | | |
|---|---|---|---|
| 5,385,590 A | 1/1995 | Sledge | |
| 6,983,562 B2 | 1/2006 | Sanderson | |
| 9,807,949 B2* | 11/2017 | Hamlin | .......... A01G 31/02 |
| 2006/0272210 A1 | 12/2006 | Bissonnette et al. | |
| 2013/0205662 A1* | 8/2013 | Yancey | .......... A01G 27/02 47/66.6 |
| 2015/0289460 A1* | 10/2015 | Vanderveken | ....... A01G 27/003 47/66.7 |
| 2015/0289463 A1* | 10/2015 | Moriarty | ................ A01G 31/02 47/62 R |

FOREIGN PATENT DOCUMENTS

WO   WO 2012/104789   8/2012

OTHER PUBLICATIONS

HydroFarm "Emily's Garden", HydroFarm Garden Center, Instruction Manual, 4 P., Mar. 2012.

* cited by examiner

*Primary Examiner* — Monica L Williams

(57) ABSTRACT

A hydrophonic planter for growing plants, comprising one or more growing cups filled with growing bed substrate, one or more dry tubes attached to a bottom side of the growing cup(s) where the dry tube(s) is mechanically coupled to a container containing nutrient solution, one or more water pumps driving a sprinkle of the nutrient solution through water pipes into the growing cup(s), a controller controlling operation of the water pump(s) and a communication component electronically coupled to the controller for communicating with one or more remote devices to transfer data between the controller and the remote device(s). Wherein the sprinkle flows over roots of one or more plants planted in the growing cup(s). A residue of the sprinkle flows through one or more holes located at the bottom side of the growing cup(s) and through the dry tube(s) to be accumulated at the bottom of the dry tube(s).

14 Claims, 9 Drawing Sheets

HYDROPHONIC PLANTER

RELATED APPLICATION

This application claims the benefit of priority under 35 USC 119(e) of U.S. Provisional Patent Application No. 62/168,823 filed on May 31, 2015, the contents of which are incorporated herein by reference in their entirety.

BACKGROUND

The present invention, in some embodiments thereof, relates to growing plants in indoor spaces using hydrophonic technology and, more specifically, but not exclusively, to growing plants in indoor spaces using hydrophonic technology in a controlled growth environment.

The use of Hydrophonics technologies in modern agriculture is rapidly increasing to improve crops volume and/or quality, utilize urban areas for agricultural use and/or facilitate environment friendly agricultural.

The Hydrophonics technologies as opposed to traditional plant growing methods and practices provide a controlled environment for the plants in the sense that most growth parameters may be easily and continuously monitored and adjusted thus providing optimal growth conditions for the plants.

SUMMARY

According to some embodiments of the present invention, there is provided a hydrophonic planter for growing plants, comprising:

One or more growing cups filled with a growing bed substrate.

One or more dry tubes attached to a bottom side of each of the one or more growing cups. The one or more dry tubes are mechanically coupled to a container containing a nutrient solution.

One or more water pumps that drives a sprinkle of the nutrient solution through one or more water pipes into the one or more growing cups.

A controller controlling an operation of the one or more water pumps.

A communication component electronically coupled to the controller for communicating with one or more remote devices to transfer data between the controller and the one or more remote devices.

Wherein the sprinkle flows over roots of one or more plants planted in the one or more growing cups. A residue of the sprinkle flows through one or more holes located at the bottom of the one or more growing cups and through the one or more dry tubes to be accumulated at the bottom of the one or more dry tubes.

The nutrient solution is a mixture of water and one or more fertilization materials.

The one or more plants are planted in the growing bed substrate in one of a plurality of forms, for example, a seed, a semen, a root, a bulb, a bulbet, a tuber, a shoot, a seedling and/or a plant.

The one or more water pumps draw the residue out of the one or more dry tubes back into the planter container.

The one or more dry tubes are submerged at least partially in the nutrient solution.

The one or more growing cups, the one or more dry tubes, the one or more water pumps, the controller and/or the communication component are mechanically coupled together.

The one or more growing cups, the one or more dry tubes, the one or more water pumps, the controller and/or the communication component are integrated in the container.

The container is adapted to mechanically fit into a planter outer case.

The controller collects one or more growth parameters of the one or more plants from one or more sensors coupled to the hydrophonic planter. The one or more growth status parameters are selected from a group consisting of: nutrient solution level, nutrient solution pH, nutrient solution conductivity, nutrient solution temperature, nutrient solution murkiness, light exposure, and light spectrum.

The controller transmits the one or more growth parameter to the one or more remote devices.

Optionally, the controller receives one or more updated growth directives from the one or more remote devices. The one or more updated growth directives are generated based on analysis of the one or more growth parameters.

Optionally, the controller transmits operational status data to the one or more remote devices.

Optionally, the one or more growing cups, the one or more dry tubes, the one or more water pumps, the controller and the communication component are integrated in a modular internal construction which is pluggable into the container.

Optionally, the hydrophonic planter comprises one or more visual interfaces controlled by the controller to provide one or more visual indications to a user. The visual indications comprise one or more of, an indication of a state of at least growth parameter and/or an indication of one or more operational parameters of the hydrophonic planter. The one or more visual interfaces include an indication light and/or a display.

Optionally, the hydrophonic planter comprises one or more mechanical support component mechanically coupled to the container to support the one or more plants.

Optionally, the hydrophonic planter comprises a grow lamp mechanically coupled to the container and controlled by the controller. The grow lamp illuminates the one or more plants with at least a portion of a light spectrum.

According to some embodiments of the present invention, there is provided a method for controlling growth of a plant in a hydrophonic planter, comprising one or more processor adapted to:

Collect one or more growth parameter from one or more sensors monitoring one or more plants planted in a growing cup of an hydrophonic planter comprising a container filled with a nutrient solution.

Transmit the one or more growth parameter to one or more remote devices.

Adjust the one or more growth parameters of the one or more plants according to one or more updated growth directives received from the one or more remote devices. The one or more updated growth directives are generated based on analysis of the one or more growth parameters.

According to some embodiments of the present invention, there is provided a method for automatically controlling growth of a plant in a hydrophonic planter, comprising one or more processor adapted to:

Receiving one or more images of one or more plants planted in an hydrophonic planter. The one or more images are captured by one or more users using one or more imaging devices.

Analyze automatically the one or more images to identify a growth state of the one or more plants.

Create automatically a growth profile for the one or more plants based on the growth state.

Generate automatically one or more updated growth directives for the one or more plants based on the profile.

Transmit the one or more updated growth directives to a controller of the hydrophonic planter.

The analysis identifies one or more of: a type of the one or more plants, a growth state of the one or more plants, a disease of the one or more plants and one or more pests present in proximity to the one or more plants.

Optionally, the profile is created based on one or more of: comparison with one or more previous images of the one or more plants and user data provided by the one or more user.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
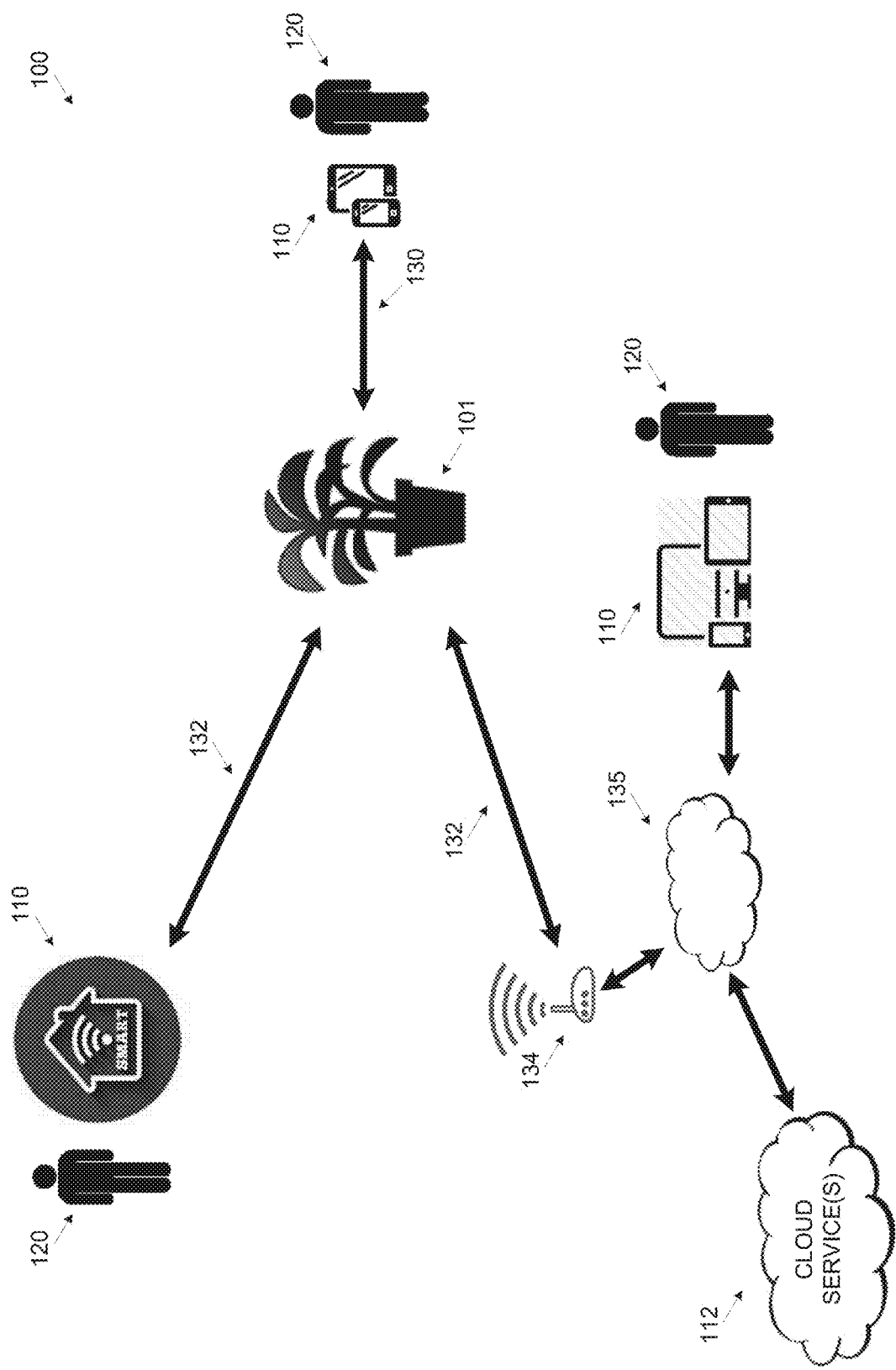
FIG. 1 is a schematic illustration of an exemplary system for growing plants using a hydrophonic smart planter, according to some embodiments of the present invention.

The present invention, in some embodiments thereof, relates to growing plants in indoor spaces using hydrophonic technology and, more specifically, but not exclusively, to growing plants in indoor spaces using hydrophonic technology in a controlled growth environment.

According to some embodiments of the present invention, there is provided a hydrophonic planter (apparatus) for growing plants in indoor environment. The hydrophonic smart planter integrated with a local controller having connectivity capabilities may provide a highly controlled growing environment for one or more plants, for example, flower, herb, vegetable, fruit, bush, tree, and/or plant. The smart planter is intended indoor and/or semi-indoor spaces, for example, home, office, institute, patio, roof and/or garden.

The hydrophonic smart planter is constructed of a container filled with a nutrient solution and an innovative internal structure supporting planting and growing of one or more plants. The nutrient solution may be a combination of water and one or more fertilization materials. The internal structure includes one or more growing cups with one or more dry tubes mechanically coupled to the bottom of each of the growing cup(s) and going down towards the bottom of the container. The growing cup(s) are filled with a growing bed substrate in which the plant(s) are planted with the roots of the plant(s) extending into the dry tube(s). The plant(s) may be planted in the growing cup(s) in one or more forms, for example, seed, semen, root, bulb, bulbet, tuber, shoot, seedling, and plant. The plant(s) roots may extend into the dry tube(s) that are isolated from the nutrient solution in the container such that the plant(s) and the roots are not submersed in the nutrient solution.

The top of the container may be covered with a cover having openings for the growing cup(s). The cover may have one or more holes to allow one or more users to refill the container with water and/or the nutrient solution(s). The internal structure may be mechanically integrated with the container such that together they form the hydrophonic smart planter. Optionally, the internal structure is a modular part that may inserted into a standard planter outer case (performing as the container) to form the hydrophonic smart planter. Moreover, the internal structure mechanically integrated with the container may be inserted into the standard planter outer case to form the hydrophonic smart planter.

The internal structure includes one or more water pumps that draw the nutrient solution from the container and drives a sprinkle of the nutrient solution through one or more water pipes to the growing cup(s). The sprinkle of the nutrient solution flows over the roots of the plant(s) in the dry tube(s) while the residue of the sprinkle goes through the dry tube(s) to be collected at the bottom of the dry tube(s). In addition to driving the sprinkle of nutrient solution to the growing cup(s), the water pump(s) may draw the sprinkle residue from the bottom of the dry tube(s) back into the container. The plant(s) are nourished by the sprinkle of the nutrient solution flowing over the roots of the plant(s).

The internal structure comprises a local controller that controls the operation of the water pump(s) according to one or more preset growth parameters directives to maintain a controlled growing plan and/or environment for the plant(s). The controller has connectivity capabilities to allow communication over one or more wireless networks with one or more remote devices used by the user(s) and/or remote control system(s). The controller collects growth status information from one or more sensors located in the smart hydrophonic smart planter. The sensor(s) monitor one or more growth conditions of the plant(s) in the hydrophonic smart planter, for example, a state of the nutrient solution, an ambient temperature, a lighting condition and/or the like.

The controller may also monitor operational status data indicating the operational parameters (conditions) of the hydrophonic smart planter. The controller may provide the growth status information of the plant(s) and/or operational status data of the hydrophonic smart planter to the user(s) using an application, for example, a mobile application and/or a web browser executed on the remote device(s). For example, the controller may collect and/or control one or more growth parameters, for example, a nutrient solution level, a nutrient solution pH level, a nutrient solution electrical conductivity, a nutrient solution murkiness, an ambient temperature and/or a light exposure and/or a spectrum the plant(s) is exposed to.

Based on the received growth status information and/or the operational status data, the user(s) may take one or more actions, for example, add water and/or the nutrient solution to the hydrophonic planter, adjust operation schedule of the pump(s), adjust lighting conditions, take maintenance action(s) and/or the like. The action(s) may be indicated by the user(s) using the application executed by the remote device. The controller may receive one or more updated growth parameters directives from the user(s) and/or the remote control system(s) to adjust one or more of the growth conditions for the plant(s).

The hydrophonic smart planter may be battery operated, powered from a power line connected to an external power outlet and/or a combination of both the batteries and the external power.

The hydrophonic smart planter may present multiple advantages for growing plants indoor. Coupled with the local controller the hydrophonic planter constantly monitors and controls the growing environment of the plant(s) to provide fully controlled optimal growing conditions. First, the hydrophonic smart planter may provide a highly controlled growing environment for the plant(s) while significantly reducing nuisances typical to traditional (non-hydrophonic) planters. The hydrophonic smart planter may reduce and even prevent altogether such nuisances, for example, water spillage, soil dirt and/or the like to provide a cleaner and/or a more tidy space. The hydrophonic smart planter may also allow extended periods of self-controlling growth of the plant(s) with no user intervention allowing the user(s) to maintain optimal growth while the user(s) is absent, for example, during weekends, during holidays, on vacations and/or the like.

Second, as opposed to current indoor hydrophonic technologies the hydrophonic smart planter uses an innovative design employing the dry tubes that significantly reduces the volume of the space required for isolating the plant(s) roots from the nutrient solution in the container. By reducing the volume of space required to isolate the plant(s) roots the volume of the container available to store the nutrient solution may significantly increase thus extending the time between nutrient solution refills. Moreover, since the plant(s) roots are isolated from the nutrient solution, the cost of the hydrophonic smart planter may be reduced since there is no need for additional water pumps to circulate and/or to oxidize the nutrient solution as may be done by the current hydrophonic technologies to prevent the plant(s) roots from rotting. In addition to the cost reduction achieved by removing the additional water pumps, noise resulting from the additional water pumps may be significantly reduced.

The innovative internal structure design allows simple refill of the container with the nutrient solution by pouring the nutrient solution over the top cover of the container thus avoiding the need for a special and potentially costly mechanism for refilling the container as may be done by the current hydrophonic technologies. Furthermore, while the hydrophonic smart planter may be constructed at various sizes to fit the plant(s) planted in it, the internal structure design may allow reduction of the container size to allow construction of small hydrophonic smart planters for use in small spaces, for example, a desk, a table, a counter, a shelf, a windowsill and/or the like. In addition the internal structure modular design may allow usage of standard planters (as containers) turning the standard planters into the hydrophonic smart planters. Using the internal structure in the standard planters may allow a large variety of exterior characteristics, for example, size, exterior design, outer case material and/or the like while reducing costs of the controlled growing environment.

Furthermore, the hydrophonic smart planter may generate alerts to the user(s) in advance to take one or more actions, for example, nutrient solution refill, batteries change, disease and/or a pest treatment and/or the like. The hydrophonic smart planter may send the alerts to the user(s) through one or more communication means, for example, a text message, an email, a mobile application alert and/or the like.

According to some embodiments of the present invention, there are provided methods and systems for automatically controlling plant growth in a controlled environment using hydrophonic technology. One or more images of one or more plants planted in a hydrophonic smart planter may be captured by one or more users. The user(s) may use one or more applications, for example, a mobile application and/or a web browser executed on a remote device, for example, a Smartphone, a camera, a tablet and/or the like to transmit the image(s) to an automated growth control server. The automated growth control server may include one or more processing nodes, for example, a server.

Optionally, the automated growth control server is implemented through cloud computing, for example, software as a service (SaaS), platform as a service (PaaS) and/or the like. The automated growth control server automatically analyzes the image(s) in conjunction with received growth data collected by a hydrophonic smart planter to identify a growth state of the plant(s). The growth state analysis may consider one or more characteristics of the plant(s), for example, a type, a growth rate, a disease, a pest and/or the like to create automatically a profile for each of the plant(s). Based on the generated profile, the automated growth control server may generate one or more updated growth parameters directives for the plant(s). The automated growth control server may transmit the updated growth parameters directive(s) to the hydrophonic smart planter to adjust one or more growth parameters for the plant(s).

The automated growth control server may adjust the profile based on comparison analysis of the captured image(s) with one or more previous images of the plant(s) growing in the hydrophonic planter captured in the past. Optionally, the automated growth control server adjusts the profile based on input data provided by the user(s).

Optionally, the automated growth control server creates and/or maintains a big-data database by analyzing a plurality of profiles created for a plurality of hydrophonic planters. The big-data database may be used for machine learning to identify optimal growing parameters for a plurality of plants in a plurality of growing environments and/or conditions.

The automatic control of plant growth in controlled environment using the hydrophonic planter may present multiple advantages for growing plants in particular for indoor spaces. The user(s) may easily grow a plurality of plants including plant(s) considered as difficult to grow and/or cultivate while possessing little and/or no gardening/ growing knowledge and/or experience. Moreover, the automated growth control server using the big-data database coupled with the machine learning may allow creating an accurate profile for the plant(s) according to specific environmental conditions to adjust the plant(s) growth parameters in order to achieve optimal growing conditions with minimal effort by the user(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a schematic illustration of an exemplary system for growing plants using hydrophonic technology, according to some embodiments of the present invention. An exemplary system 100 includes a hydrophone smart planter 101 in which one or more plants are planted and grown. The smart planter 101 integrates a controller having connectivity capabilities allowing communication with one or more of a plurality of remote device 110 used by one or more users 120. The remote device 110 may be a mobile terminal, for example, a Smartphone, a tablet and/or the like. The remote device 110 may also be a client terminal, for example, a PC (Personal Computer), a laptop computer, a proprietary client terminal and/or the like. In addition, the remote device(s) 110 may include one or more a remote systems, for example, a server, a network node, a smart home management system, a maintenance system and/or the like.

The connectivity capabilities of the smart planter 101 may allow direct connection (AD-HOC) of the smart planter 101 to the remote device(s) 110 over one or more wireless networks 130, for example, Near Field Communication (NFC), Bluetooth (BT), Wireless Local Area Network (WLAN), and/or proprietary wireless network capable of a point-to-point AD-HOC connection. Additionally and/or alternatively the smart planter 101 connectivity capabilities allow connecting to one or more wireless infrastructure networks 132, for example, ZigBee, Z-Wave, Digital Enhanced Cordless Telecommunications (DECT), WLAN, cellular and/or proprietary wireless network infrastructure for communicating with the remote device(s) 110.

The smart planter 101 may connect to the wireless infrastructure network(s) 132 directly and/or through one or more local gateway 134, for example, a router, a modem, a cellular access point and/or the like for accessing one or more global networks 135, for example, the internet and/or a cellular network. The smart planter 101 may further communicate with one or more cloud services 112, for example, an internet service, a SaaS, a PaaS and/or the like over the network(s) 135.

The smart planter 101 may be assigned with a unique device ID so the smart planter 101 may be exclusively identified when communicating with the remote device(s) 110 over the network(s) 130 and/or 132. This may allow the remote devices 110 to communicate with a plurality of smart planters such as the smart planter 101 located in close proximity.

Figure 2:
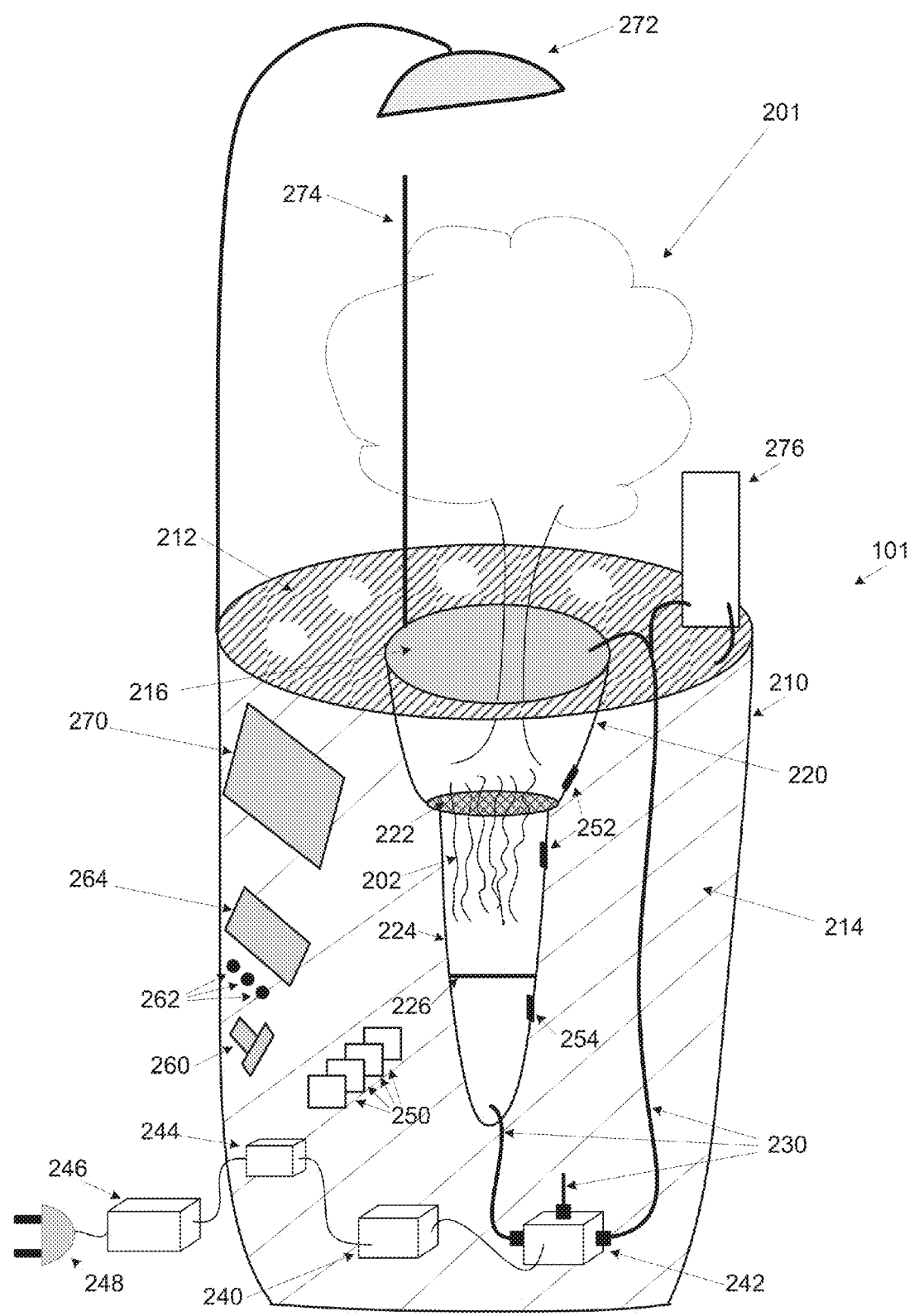
FIG. 2 is a schematic illustration of an exemplary hydrophonic smart planter, according to some embodiments of the present invention.

Reference is now made to FIG. 2, which is a schematic illustration of an exemplary hydrophonic smart planter, according to some embodiments of the present invention. An exemplary hydrophonic planter, such as the hydrophonic smart planter 101 is composed of a container 210 and an internal structure. Naturally, the container 210 is closed to store a nutrient solution 214 that may be a combination of water and one or more fertilization materials. The container 210 may be solid, transparent and/or partially transparent, however the container 210 presented herein is transparent to allow clear view of the internal elements within the container 210. Other mechanical elements and/or parts may also be presented as transparent for the same purpose. The internal structure of the smart planter 101 may be constructed to allow planting and growing of one or more plants 201.

The smart planter 101 and in particular the internal structure may be adopted to allow growing one or more plants in on roe more separate growing cups 220. The number of the growing cups 220 may depend, for example, on a size of the smart planter 101, a size of each of the growing cups 220 and or the like. Of course, a plant 201 planted in one of the growing cups 220 must fit the size and growing capacity of the growing cup 220 and/or the smart planter 101.

The user 120 may plant and/or grow one or more plants 201 in each of the growing cups 220. However, the plants 201 sharing the same growing cup 220 may need to share similar growing conditions since each cup is controlled as a single unit, i.e., it is impossible to apply different growing conditions to two or more plants 201 growing in the same growing cup 220.

The internal structure comprises the fundamental and/or essential parts of the smart planter 101 such that coupled with the container 210 they form the smart planter 101. The internal structure comprises one or more growing cups 220, one or more dry tubes 224 that mechanically connect to the bottom of the growing cup(s) 220, one or more water pipes 230, one or more water pump 242 and a controller 240 having wireless communication capabilities. The internal structure further includes one or more sensors 250, 252 and/or 254 connected to the controller 240 through one or more wired and/or wireless interfaces. The controller 240, the water pump 242 and/or the sensors 250, 252 and/or 254 may be powered from a power source 244, for example, one or more batteries, an external power source and/or a combination of the battery(s) and the external power source.

The external power source may comprise a transformer 246 connected to an external power outlet 248. The battery(s) may include one or more rechargeable batteries that may be recharged while connected to an external power supply 246 (and of course 248). The controller 240 may comprise one or more processors and one or more supporting peripherals, for example, a random access memory (RAM), a non-volatile memory for code and/or data storage, communication interfaces and the likes. The controller 240 may comprise an integrated wireless communication component for connecting to one or more wireless networks such as the networks 130 and/or 132. Additionally and/or alternatively, the communication component is a separate device connected to the controller 240 through one or more of the communication interfaces of the controller 240.

The water pump 242 may be a water resistant pump capable of being submerged in the nutrient solution 214 while maintaining full functionality. Additionally and/or alternatively, the water pump 242 is not a water resistant pump and is located outside of the nutrient solution 214. In such configuration, the water pump 242 connects to the water pipes 230 through sealed mechanical interfaces for driving the nutrient solution 214 to the growing cup(s) 220 and/or for draining the sprinkle residue from the dry tube(s) 224.

Figure 3A:
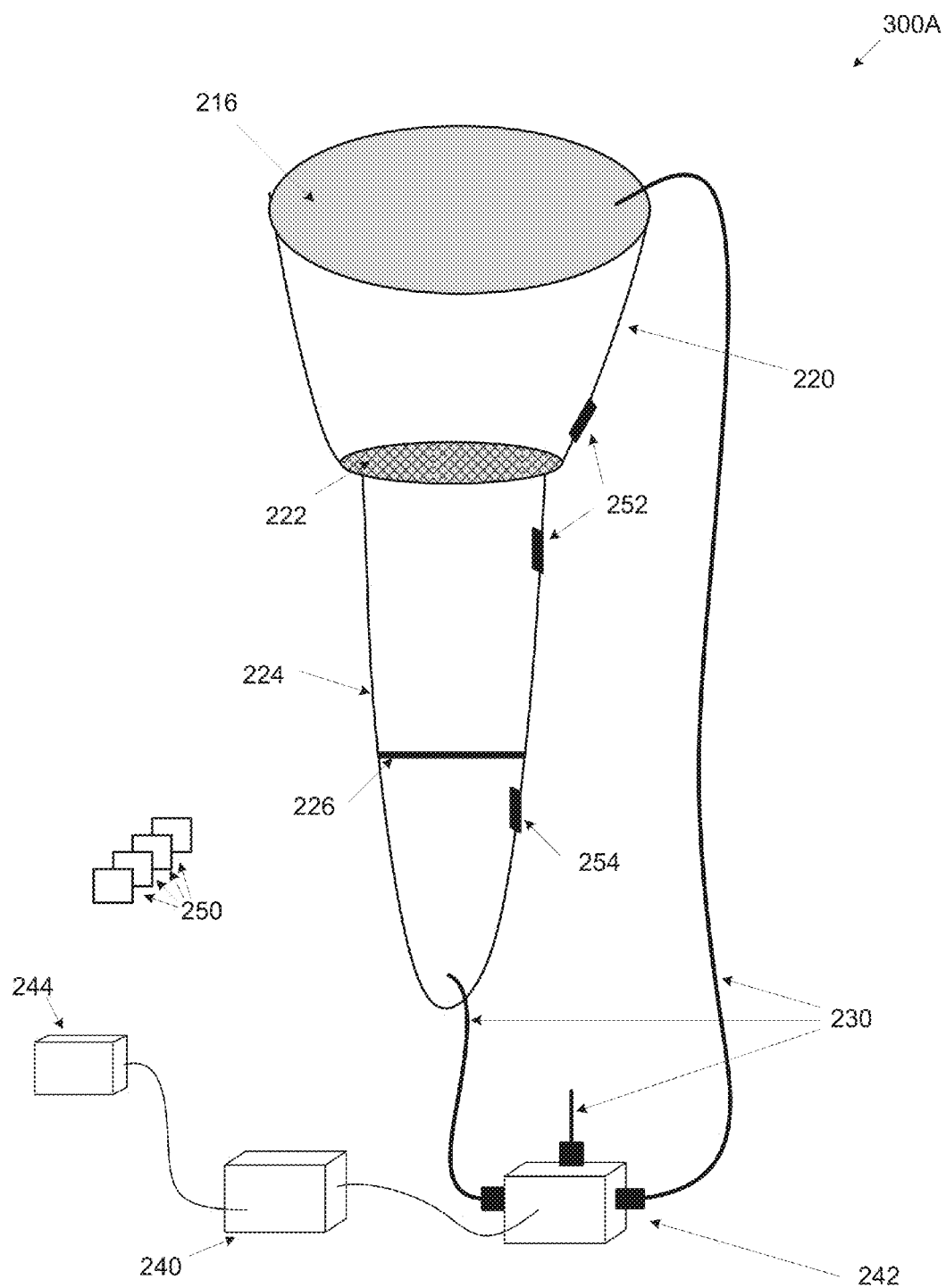
FIG. 3A is a schematic illustrations of a first exemplary embodiment of an internal structure of a hydrophonic smart planter, according to some embodiments of the present invention.
Figure 3B:
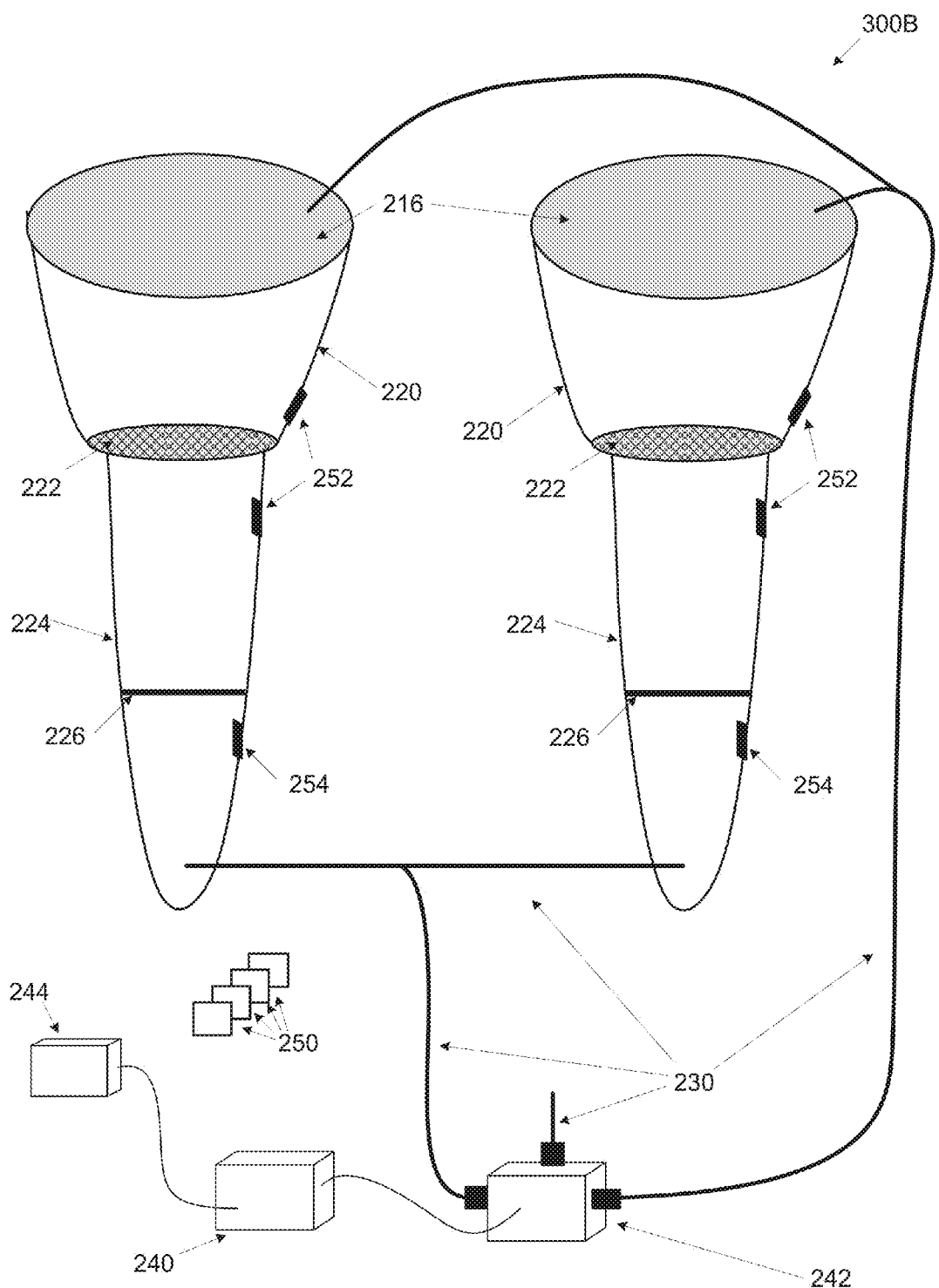
FIG. 3B is a schematic illustrations of a second exemplary embodiment of an internal structure of a hydrophonic smart planter, according to some embodiments of the present invention.
Figure 3C:
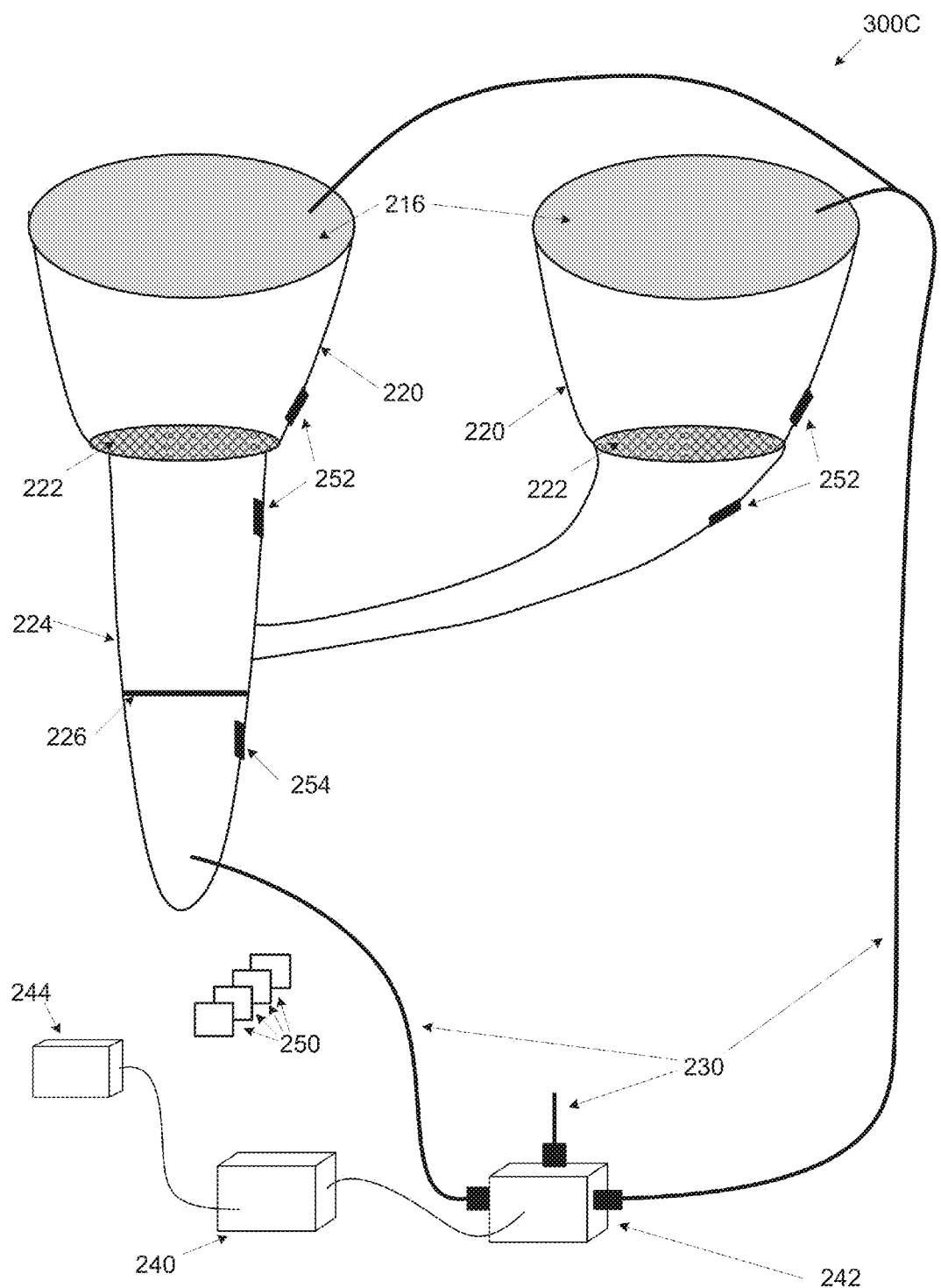
FIG. 3C is a schematic illustrations of a third exemplary embodiment of an internal structure of a hydrophonic smart planter, according to some embodiments of the present invention.

Reference is now made to FIGS. 3A, 3B and 3C which are schematic illustrations of exemplary embodiments of an internal structure of a hydrophonic smart planter, according to some embodiments of the present invention. Shown in FIG. 3A, is an exemplary internal structure 300A of a hydrophonic smart planter such as the hydrophonic smart planter 101. The internal structure 300A is designed with a single growing cup such as the growing cup 220. The internal structure 300A includes the growing cup 220, a dry tube such as the dry tube 224, one or more water pipes such as the water pipes 230, a water pump such as the water pump 242 and a controller such as the controller 240. The internal structure 300A also includes one or more sensors such as the sensors 250, 252 and/or 254 connected to the controller 240 through wired and/or wireless communication.

The controller 240, the water pump 242 and/or the sensors 250, 252 and/or 254 may be powered from a power source such as the power source 244. Shown in FIG. 3B, is an exemplary internal structure 300B of the hydrophonic smart planter 101 designed with two growing cups 220. The internal structure 300B includes two growing cups 220, two dry tubes 224, water pipes 230, the water pump 242 and the controller 240. The two dry tubes 224 are connected together such that the single water pump 242 serves both the dry tubes 224. As shown in FIG. 3C, an exemplary internal structure 300C of the hydrophonic smart planter 101 may support two growing cups 220 with a single dry tube 224. Additional various combinations with varying number of the growing cups 220 and the dry tubes 224 may be constructed.

The internal structure 300 may be integrated with the container 210 to form the smart planter 101. Optionally, the internal construction may be a fitted in a planter outer case such that the combined internal structure 300 and the planter outer case form together the smart planter 101. The planter outer case may be a standard planter case made of, for example, plastic, clay, metal, wood and/or the like. As another option, the container 210 integrated with the internal structure 300 form together an internal container may be fitted into the standard planter outer case to form the smart planter 101. The external container 210 is filled with a nutrient solution 220 composed of water or a mixture of water and one or more fertilization materials. The external container 210 may be composed of one or more materials, for example, plastic, fiberglass, metal, terracotta, marble, stone, concrete, and/or treated wood.

Figure 4:
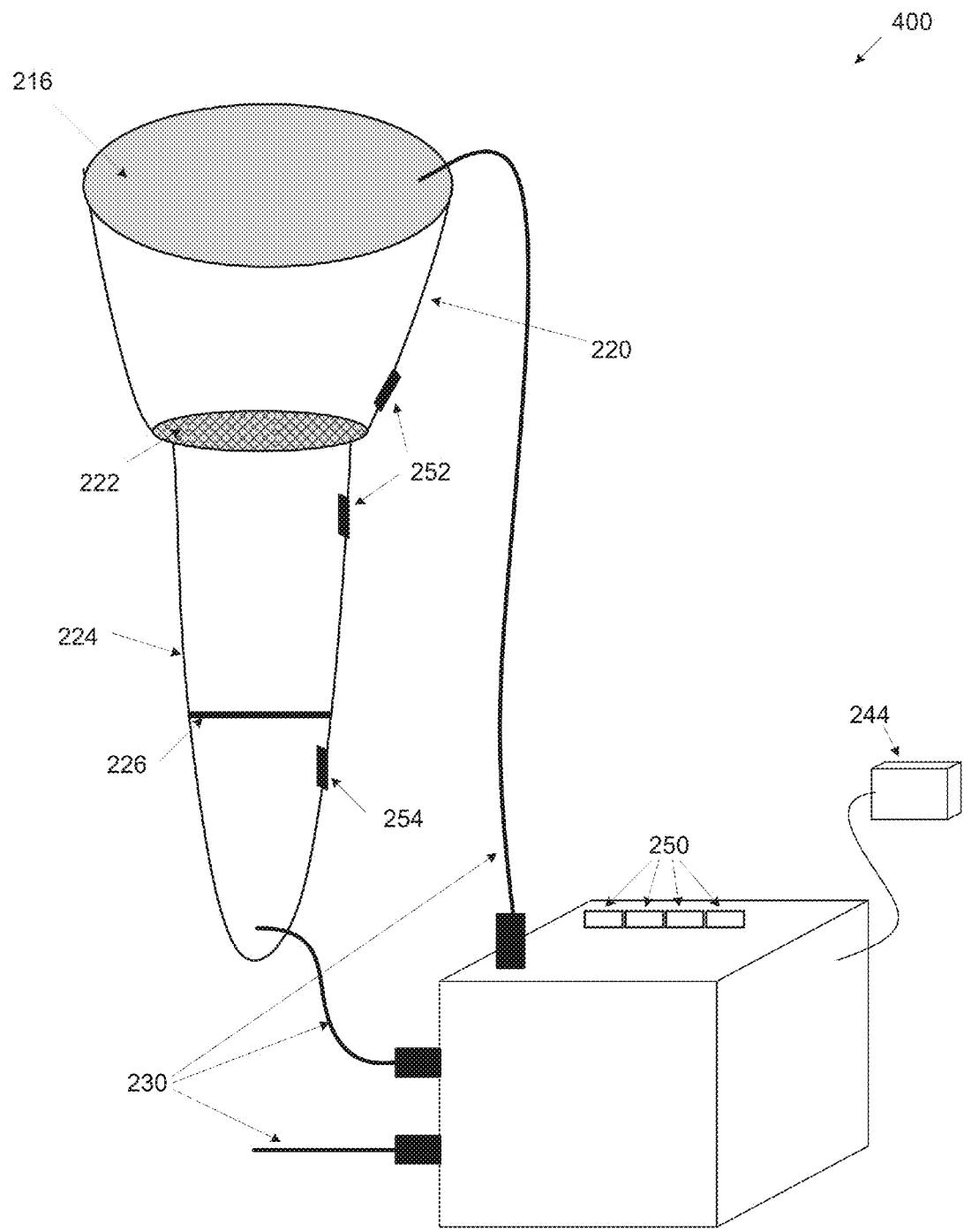
FIG. 4 is a schematic illustration of an exemplary modular internal structure of a hydrophonic smart planter, according to some embodiments of the present invention.

Reference is now made to FIG. 4, which is a schematic illustration of an exemplary modular internal structure of a hydrophonic smart planter, according to some embodiments of the present invention. A modular internal construction 400 includes a growing cup such as the growing cup 220, a dry tube 224 mechanically coupled to the bottom of the growing cup, one or more water pipes such as the water pipe 230 and a control unit 410. The modular internal structure 400 also includes one or more sensors such as the sensors 250, 252 and/or 254 connected to the controller 240 through one or more wired and/or wireless interfaces. The control unit 410 comprises one or more water pumps such as the water pump 242 and a controller such as the controller 240. The control unit 410 may further integrate one or more of the sensors 250, 252 and/or 254. The control unit 410 is powered from a power source such as the power source 244. Optionally, the power source 244 is integrated in the control unit 410.

The modular internal construction 400 may be easily integrated with one or more of a plurality of external containers, for example, the standard planter outer case thus providing a plurality of exterior designs while utilizing a single internal structure such as the modular internal structure 400. The one or more exterior designs may differ in their external features, for example, color, size, texture, and/or material according to user data provided by the user(s) 120, for example, a preference. The modular internal structure 400 may be removed from the external container for maintenance purposes with no need to drain the nutrient solution 214 from the container 210. After maintenance is complete, the modular internal structure 400 may be simply inserted back into the container 210.

Reference is made once again to FIG. 2. A user such as the user 120 may plant one or more plants such as the plant 201, in particular plants intended for indoor use, for example, flower, herb, vegetable, fruit, bush, tree, and/or plant in the smart planter 201. The plant(s) 201 may be planted in one or more forms, for example, seed, semen, root, bulb, bulbet, tuber, shoot, seedling and/or the like. The user 120 plants the plant 201 in the growing cup 220 that is filled with a growing bed substrate 216 which may be composed of one or a combination of one or more materials, for example, clay aggregate, coconut coir, perlite, peat, vermiculite, polystyrene beads, saw dust, rockwoll, stonewool, sand and/or the like. While the plant 201 grows its roots 202 may extend into the dry tube(s) 224 that are isolated from the nutrient solution 214 contained in the container 210 such that the plant(s) 201 and the roots 202 are not submersed in the nutrient solution 214.

The water pump 242 is controlled by the controller 240 according to one or more preset growth parameters directives that may be adjusted to provide optimal growing conditions for the plant(s) 201. The controller 240 may instruct the water pump 242 to a nutrient solution such as the nutrient solution 214 stored in a container such as the container 210 and drive the nutrient solution 214 through the water pipe(s) 230 to the growing cup 220. The water pumps 242 may draw the nutrient solution 214 from the container 210 through one or more water pipes 230. A sprinkle of the nutrient solution 214 comes out of the water pipes 230 into the growing cup 220 and flows over the roots 202 of the plant(s) 201. The sprinkle that flows over the roots 202 of the plant(s) 201 provides the plant(s) 201 with fluids and/or fertilization required by the plant(s) 201. The growth of the plant(s) 201 may be controlled by the amount and/or frequency of the sprinkle flowing over the roots 202 thus the growth parameters directive(s) control the growth of the plant(s) 201.

A residue of the sprinkle flows to the bottom 222 of the one or more growing cups 240. The bottom 222 may have one or more holes through which the residue of the sprinkle drops into the dry tube 224 mechanically coupled to the growing cup 240. The dry tube 224 is at least partially submerged in the nutrient solution 214 such that at least the bottom side of the dry tube where the water pipe 230 connected to the water pump 242 is submerged in the nutrient solution 214.

The bottom 222 may be constructed to allow the sprinkle to flaw through as well as the roots 202 to extend into the dry tube 224 while preventing particles of the growing bed substrate from infiltrating into the dry tube 224. The water pump 242 draws the sprinkle residue from the dry tube 224 through one or more of the water pipes 230 back into the container 210. The dry tube 224 is designed to occupy a small portion of the volume of the container 210 such that the dry tube 224 keeps the roots 202 isolated from the nutrient solution 214 but allows a maximal volume of the nutrient solution 214 to be stored in the container 210. The dry tube 224 may include a barrier 226 to prevent the roots 202 from expanding to the bottom of the dry tube 224 where the roots 202 may interfere with the operation of drawing the sprinkle residue out of the dry tube 224. The barrier 226 may include one or more means to prevent the roots 202 from going through the barrier 226, for example, mechanical barrier, chemical and/or biological coating that may repel and/or exterminate the roots 202 and/or the like.

The water pump 242 may be instructed by the controller 240 to draw the sprinkle residue. Optionally, a separate water pump 242 is used for draining the sprinkle residue from the dry tube 224. Optionally, one or more electromechanical valves are used to control the source of the water pump, either to drive the nutrient solution 214 from the container 210 to the growing cup 220 and/or to draw the sprinkle residue out of the dry tube 224 and back to the container 210. The electromechanical valve(s) may be controlled by the controller 240.

One or more filters may be installed at the input to the water pump(s) 242 to avoid solid particles, for example, particles of the growing bed substrate 216, leaves, roots 202 and/or the like from coming into the water pump(s) 242. The solid particles may jeopardize the proper operation of the water pump(s) 242 and may even lead to a malfunction of the water pump(s) 242.

The container 210 may be covered with a cover 212 such that the nutrient solution 214 is not exposed. The cover 212 may be adapted to have one or more openings for the growing cup(s) 240. The cover 212 may include mechanical means, for example, assembly hooks, snap connections and/or the like to attach mechanically to the growing cup(s) 220 and/or the container 210. Optionally, the cover 212 further include one or more opening to allow the user 120 to refill the nutrient solution 214 to the container 210 by pouring the nutrient solution 214 on the cover 212.

The controller 240 may collect continuously and/or periodically growth status information comprising one or more growth parameters received from one or more of the plurality of sensors 250, 252 and/or 254 monitoring the growing environment and/or conditions of the plant(s) 201. The growth status information may include for example, nutrient solution availability, fertilization material(s) concentration, temperature, humidity and/or lighting conditions. The sensors 250 may include for example, a (nutrient solution) level sensor, a pH sensor, an electrical conductivity sensor, a temperature sensor, a murkiness sensor, and/or a light exposure and/or spectrum sensor. The pH sensor, the electrical conductivity sensor, the temperature sensor and/or the murkiness sensor may be used to determine the conditions of the nutrient solution 214. The sensors 250 may be located as appropriate for their functionality. For example, the level sensor, the pH sensor, the electrical conductivity sensor, the temperature sensor and the murkiness sensor may be placed within the container 210, preferable at the bottom of the container 210 to maintain contact with the nutrient solution 214. Another temperature sensor 250 may be placed outside the container 210 to provide ambient temperature information.

The light exposure/spectrum sensor(s) may also be placed outside the container 210 to provide information on the lighting conditions the plant 201 is exposed to. The controller 240 may also collect humidity information from one or more humidity sensors 252 located in the growing cup 220 and/or in the dry tube 224 next to the roots 202. Empiric data acquired through, for example, experiments and/or analytical calculations may be used to determine the humidity of the roots 202 and/or the amount of nutrient solution 214 consumed by the plant(s) 201.

The controller 240 may connect to one or more sensors such as the sensor 254 to identify a level of the sprinkle residue in the dry tube 224. When the sprinkle residue reaches a first threshold, the controller 240 may instruct the water pump(s) 242 to draw the sprinkle residue from the dry tube 224 and back into the container 210. When the sprinkle residue falls below a second threshold, the controller 240 may instruct the water pump(s) 242 to stop working. This operation mode may allow preventing the sprinkle residue from reaching the roots 202 while preserving energy by operating the water pump(s) 240 only as required.

Optionally, the controller 240 collects operational status data indicating operational parameters of the smart planter 101, for example, an operation state of the water pump(s) 242, a battery level, a condition of one or more filters, a system failure(s) and/or maintenance conditions of the smart planter 101.

The controller 240 may transmit the collected growth status information to one or more remote devices such as the remote device 110 and/or to one or more cloud services such as the cloud services 112 over one or more networks, such as the networks 130 and/or 132. In case the operational status data is available, it may also be transmitted by the controller 240 to the remote device 110 and/or to the cloud services 112.

The growth status information may be received and viewed by the user(s) 120 using one or more applications, for example, a mobile application and/or a web browser executed by the remote devices 110. Optionally, the growth status information may be retrieved by the user(s) 120 from the cloud service(s) 112 that received the growth status information from the controller 240.

Optionally, the controller 240 initiates one or more alerts to indicate an immediate action is required by the user(s) 120 with respect to the growth conditions of the plant 201 and/or the operational conditions of the smart planter 101. The alert(s) may be utilized through, for example, instant messages, emails, alerts in the mobile application and/or the like. Optionally, the alerts are generated by the cloud service(s) 112 based on the growth status information and/or the operational status data received from the controller 240.

The received growth status information may be analyzed by the user(s) 120 and/or the remote systems 110. Based on the analysis the user(s) 120 and/or the remote systems 110 may take action, for example, add water to the nutrient solution 220, add fertilization material(s) to the nutrient solution 220, turn lighting devices ON/OFF and/or the like. The user(s) 120 and/or the remote system(s) 110 may further issue one or more updated growth parameters directives, for example change operation schedule of the water pump(s) 242 and/or change a lighting operation schedule and/or spectrum. The user(s) 120 may also take one or more maintenance actions according to the operational status data received from the controller 240, for example, change the battery(s), clean the filter(s) and/or the like. The user(s) 120 may also issue the updated growth parameters directive(s) according to their personal one or more preferences, for example, expedite growth of the plant(s) 201 and/or the like.

The user(s) 120 using the remote devices 110 and/or the remote system(s) 110 may transmit the updated growth parameters directive(s) to the controller 240 that may apply the updated growth parameters directive(s) in the smart planter 101.

Optionally, one or more indication lights 262, for example, a LED (Light Emitting Diode) are attached and/or integrated to the smart planter 101 to provide the user(s) 120 with indications on the growth parameter(s) of the smart planter 101, the growth conditions of the plant(s) 201 and/or the smart planter 101 operational status. The indication light(s) 262 is controlled by the controller 240.

Optionally, a display 264 is attached and/or integrated to the smart planter 101 to provide the user(s) 120 with indications on the growth parameter(s) of the smart planter 101, the growth conditions of the plant(s) 201 and/or the smart planter 101 operational status. The display 264 may include touch screen capabilities to provide the one or more users 120 with a user interface to control functional settings of the hydrophonic planter, for example, ON/OFF, pump(s) operation time, system reset, and/or wireless connection setup. The display 264 is controlled by the controller 240.

Optionally, one or more buttons and/or switches 260 are attached and/or integrated to the smart planter 101 to provide the user(s) 120 with the user interface to control functional settings of the smart planter 101.

Optionally, a grow lamp 272 is attached and/or integrated to the smart planter 101 to illuminate the plant(s) 201 to provide optimal lighting conditions. The light generated by the grow lamp 272 may include the complete light spectrum and/or a part thereof. The grow lamp 272 is controlled by the controller 240 that may set a lighting schedule and/or light spectrum according to the growth parameters directive(s).

Optionally, one or more solar panels 270 are attached and/or integrated to the smart planter 101 to provide power to the smart planter 101 through solar energy. The one or more solar panels may charge the rechargeable battery(s).

Optionally, a motion detection sensor is attached and/or integrated to the smart planter 101 to provide indication to the user(s) 120 in the event the smart planter 101 is moved with no authorization by the user(s) 120. The motion detection sensor connects to the control unit 240 that may transmit a movement alert to the remote devices 110 used by the user(s) 120.

Optionally, one or more mechanical support elements 274 are attached and/or integrated to the smart planter 101 to support the plant(s) 201 such that they may be properly held in a desired location and/or position within the hydrophonic planter 101.

Optionally, one or more water driven accessories 276 are attached and/or integrated to the smart planter 101, for example, a water fall, a fish tank, an aquarium, a water vane and/or the like. The water pump(s) 242 may drive a water stream to the water driven accessory(s) 276 through one or more water pipes such as the water pipes 230. The water pipe(s) 230 may be integrated with the water pipe(s) 230 used for driving water to the plant(s) 201 and/or they may be separately routed from the water pump(s) 242 to the water driven accessory(s) 276. The water stream coming out of the water driven accessory(s) 276 may be drained through one or more water pipes such as the water pipes 230 to the external container 210 and/or to the growing cup(s) 220. Optionally, the water stream coming out of the water driven accessory(s) 276 may be directly routed to the container 210 not using the water pipes 230. Optionally, the container 210 may be integrated with one or more fish tanks and/or aquariums in which one or more animals may be grown, for example, fish, turtles, lizards, snakes and/or the like.

Figure 5:
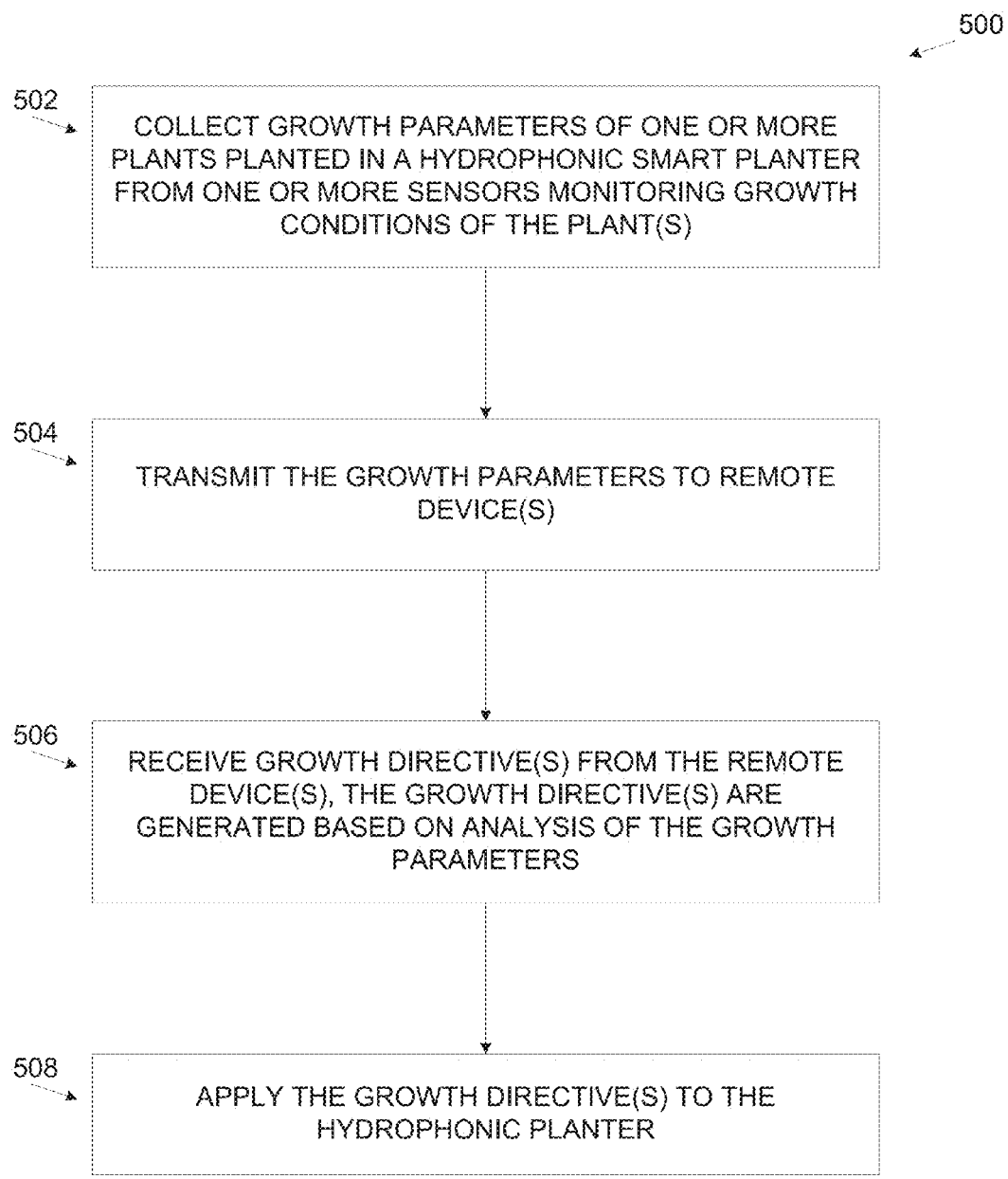
FIG. 5 is a flowchart of an exemplary process of growing plants using hydrophonic technology, according to some embodiments of the present invention.

Reference is now made to FIG. 5, which is a flowchart of an exemplary process of growing plants using hydrophonic technology, according to some embodiments of the present invention. An exemplary process 500 may be executed using a system such as the system 100 for growing and controlling growth of one or more plants such as the plant 201 using a hydrophonic smart planter such as the hydrophonic smart planter 101.

As shown at 502, the process 500 starts with a controller such as the controller 240 collecting growth status information comprising one or more growth parameters of the plant(s) 201. The growth parameter(s) are collected from one or more sensors such as the sensors 250, 252 and/or 254 monitoring growth environment and/or condition(s) of the plant(s) 201. The growth parameters may include, for example, a nutrient solution level, a nutrient solution pH level, a nutrient solution electrical conductivity, a nutrient solution temperature, a nutrient solution murkiness, an ambient temperature and/or light exposure/spectrum the plant(s) 201 are exposed to. Optionally, the controller 240 collects operational status data indicating one or more operational parameters of the smart planter 101, for example, an operation state of one or more water pumps such as the water pump 242, a battery level, a condition of one or more filters, a system failure(s) and/or maintenance conditions of the smart planter 101.

As shown at 504, the controller 240 transmits the growth status information and/or the operational status data over one or more networks such as the networks 130 and/or 132. The controller 240 transmits may transmit the growth status information and/or the operational status data to one or more remote devices such as the remote devices 110 used by one or more users such as the user 120 and/or one or more remote systems such as the remote systems 110. Optionally, the controller 240 transmits the growth status information and/or the operational status data to one or more cloud services such as the cloud services 112.

The received growth status information and/or the operational status data may be analyzed by the user(s) 120, the remote system(s) 110 and/or the cloud service(s) 112. Based on the analysis the user(s) 120, the remote system(s) 110 and/or the cloud service(s) 112 may generate and transmit to the smart planter 101 one or more updated growth parameters directives for the plant(s) 201. The updated growth parameters directive(s), for example, change operational schedule of one or more water pumps such as the water pump 242 and/or change lighting conditions aim to alter the nourishment plan of the plant(s) 201 in order to control the growth of the plant(s0 201. The updated growth parameters directive(s) may be adjusted according to user data provided by the user(s) 120, for example, a preference.

As shown at 506, the controller 240 receives the updated growth parameters directive(s).

As shown at 508, the controller 240 applies the growth parameters directive(s), for example, adjust the operation plan of the water pump 242, adjust the lighting conditions and/or the like.

According to some embodiments of the present invention, there are provided methods and systems for automatically controlling plant growth in a controlled environment using hydrophonic technology.

One or more images of one or more plants planted in a hydrophonic smart planter may be captured by one or more users. The user(s) may use one or more applications, for example, a mobile application and/or a web browser executed on a remote device, for example, a Smartphone, a camera, a tablet and/or the like to transmit the image(s) to an automated growth control server. The automated growth control server may include one or more processing nodes, for example, a server. Optionally, the automated growth control server is implemented through cloud computing, for example, software as a service (SaaS), platform as a service (PaaS) and/or the like. The automated growth control server automatically analyzes the image(s) in conjunction with received growth data collected by a hydrophonic smart planter to identify a growth state of the plant(s). The growth state analysis may consider one or more characteristics of the plant(s), for example, a type, a growth rate, a disease, a pest and/or the like to create automatically a profile for each of the plant(s). Based on the generated profile, the automated growth control server may generate one or more updated growth parameters directives for the plant(s). The automated growth control server may transmit the updated growth parameters directive(s) to the hydrophonic smart planter to adjust one or more growth parameters for the plant(s). The automated growth control server may adjust the profile based on comparison analysis of the captured image(s) with one or more previous images of the plant(s) growing in the hydrophonic planter captured in the past. Optionally, the automated growth control server adjusts the profile based on input data provided by the user(s).

Optionally, the automated growth control server creates and/or maintains a big-data database by analyzing a plurality of profiles created for a plurality of hydrophonic planters. The big-data database may be used for machine learning to identify optimal growing parameters for a plurality of plants in a plurality of growing environments and/or conditions.

Figure 6:
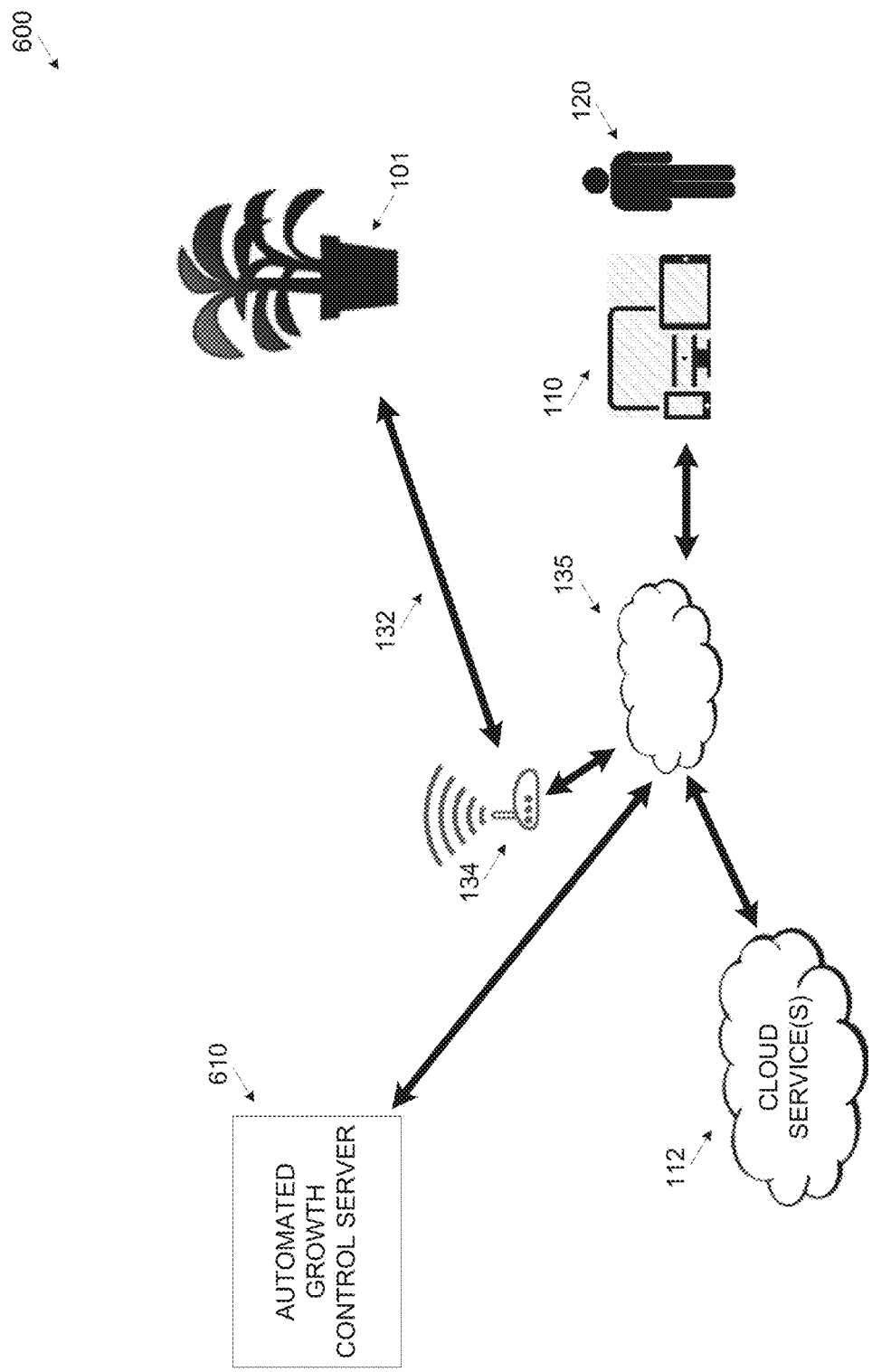
FIG. 6 is a schematic illustration of an exemplary system for automatically controlling growth of plant(s) growing in a hydrophonic smart planter, according to some embodiments of the present invention.

Reference is now made to FIG. 6, which is a schematic illustration of an exemplary system for automatically controlling growth of plant(s) growing in a hydrophonic smart planter, according to some embodiments of the present invention. An exemplary system 600 such as the system 100 includes an automated growth control server 610 for automatically controlling growth of a plurality of plants such as the plant 201 planted in a plurality of hydrophonic smart planters such as the hydrophonic smart planter 101.

The automated growth control server 610 comprises one or more processing nodes, for example, a server, a processing node, a network node, a cluster of processing nodes, a cluster of distributed processing nodes and/or the like. Optionally, the automated growth control server 610 is utilized through one or more cloud services such as the cloud services 112. The automated growth control server 610 communicates with the hydrophonic smart planters 101 over one or more networks such as the network 135. The automated growth control server 610 may be accessible to one or more users such as the user 120 using an application, for example, a mobile application, a web browser and/or the like executed on one or more remote devices such as the remote device 110. The automated growth control server 610 may be coupled with one or more additional cloud services of the cloud services 112 to control the growth of the plant(s) 201.

Figure 7:
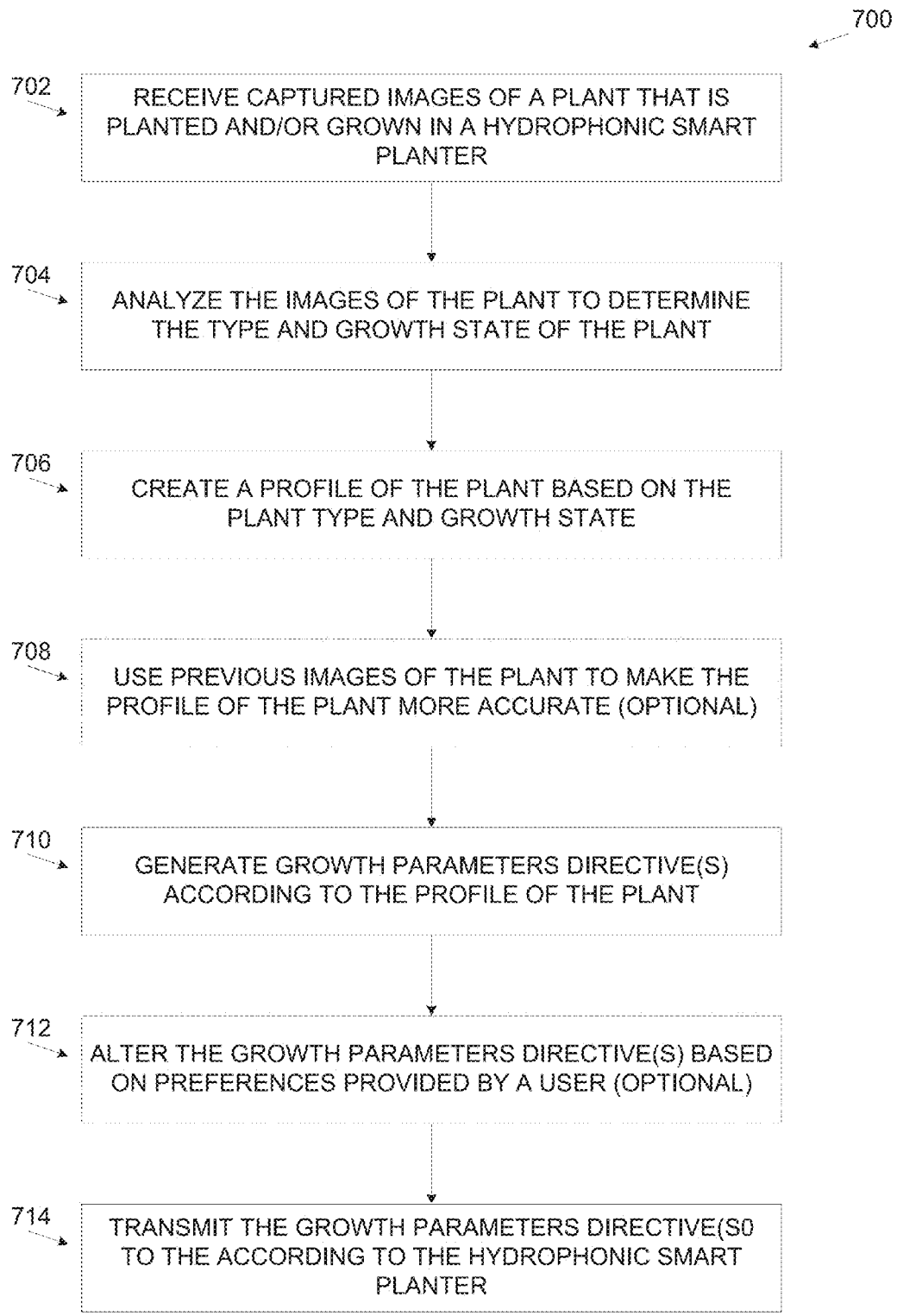
FIG. 7 is a flowchart of an exemplary process of automatically controlling growth of plant(s) growing in a hydrophonic smart planter, according to some embodiments of the present invention.

Reference is also made to FIG. 7, which is a flowchart of an exemplary process of automatically controlling growth of plant(s) growing in a hydrophonic smart planter, according to some embodiments of the present invention. A process 700 for automatically controlling growth of the plant 201 planted in the hydrophonic smart planter 101 may be executed by a system such as the system 600.

As shown at 702, the process 700 starts with the automated growth control server 610 receiving one or more images that depict the plant(s) 201 growing in the hydrophonic smart planter 101. The image(s) may be captured by the user(s) 120 using one or more imaging devices, for example, a camera, a Smartphone integrated camera and/or the like. The user(s) 120 may the image(s) to the automated growth control server 610 using the application. Optionally, through the application, the automated growth control server 610 directs the user(s) 120 to capture the image(s) from one or more, for example, distances, angles and/or the like.

As shown at 704, the automated growth control server 610 analyzes the image(s) of the plant(s) 201 to determine a growth state of the plant(s) 201. The growth state includes, for example, identifying a type of the plant(s) 201, a growth rate of the plant(s) 201 and/or a health state of the plant(s) 201. The automated growth control server 610 may determine the growth rate based on a typical growth rate of the type of the plant(s) 201. The typical growth rate may be driven from one or more databases and/or other data storage locations in which information is available for plants in general and for the plant(s) 201 in particular.

The automated growth control server 610 may estimate the growth state by assessing the size of the plant(s) 201. The automated growth control server 610 may assess the size of the plant(s) 201 with respect to one or more marks and/or objects imprinted and/or attached to the hydrophonic smart planter 101. For example, one or more marks may be imprinted on the external side of the smart planter 101. The automated growth control server 610 is familiar with the dimensions of the imprinted mark(s) and may assess the size of the plant(s) 201 with respect to the known dimensions of the imprinted mark(s). The automated growth control server 610 may further identify disease and/or pest signs visible on the plant(s) 201 and/or in proximity to the plant(s) 201. The automated growth control server 610 may determine the type of the disease and/or pest based on comparison analysis with information available from the database(s) and/or the other data storage location(s).

As shown at 706, the automated growth control server 610 creates a profile for each of the plant(s) 201 based on the analysis. The profile may include, for example, the type of the plant(s) 201, environmental conditions of the plant(s) 201, growth parameters directives and/or the like. The environmental conditions may specify, for example, a geographic location, a season of the year, physical conditions the plant(s) 201 is exposed to, for example, type of a nutrient solution such as the nutrient solution 214, ambient temperature, ambient humidity, lighting conditions, location within the indoor space and/or the like.

The automated growth control server 610 may create the profile by analyzing data extracted from the image(s), analyzing the information retrieved from the database(s) and/or the growth status information received from a local controller such as the controller 240 integrated in the smart planter 101. The automated growth control server 610 may update the profile with information provided by the user(s) 120, for example, a time of planting the plant(s) 201, an age of the plant(s) 201, the environmental conditions and/or the like. The automated growth control server 610 may further update the profile with previous information of received from the smart planter 101 in the past.

As shown at 708, which is an optional step, the automated growth control server 610 may create and/or update the profile of the plant(s) 201 by analyzing the image(s) compared to one or more previous images provided by the user(s) 120 in the past. By comparing the captured image(s) to the previous image(s), the automated growth control server 610 may identify changes in the growth state of the plant(s) 201, for example, normal growth rate, insufficient growth rate, high growth rate and/or the like. The automated growth control server 610 may update the profile accordingly with the detected changes.

As shown at 710, based on the profile, the automated growth control server 610 automatically generates one or more updated growth parameters directives. The updated growth parameters directive(s) may include, for example, instructing the user(s) 120 to change a composition of a nutrient solution such as the nutrient solution 214, altering an operation schedule of one or more water pumps such as the water pump 242, altering a lighting schedule and/or light spectrum of one or more grow lamps such as the grow lamp 272 and/or the like.

As shown at 712, which is an optional step, the automated growth control server 610 may adjust the updated growth parameters directive(s) according to user data (preference) provided by the user(s) 120 using the application, for example, s desired growth rate. The desired growth rate may be expressed as, for example, fast grow rate, slow grow rate and/or maintain current size.

As shown at 714, the automated growth control server 610 transmits the updated growth parameters directive(s) to the controller 240 of the smart planter 101 that may in turn apply the updated growth parameters directive(s) to control the growth of the plant(s) 201.

Optionally, the automated growth control server 610 creates and/or maintains a big-data database by analyzing a plurality of profiles created for a plurality of hydrophonic planters 101 in which a plurality of plants 201 are planted. The automated growth control server 610 may use the big-data database to apply machine learning for accurately creating the profiles and/or for calculating optimal growing parameters for the plurality of plants 201 in a plurality of growing environments and/or conditions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A hydrophonic planter for growing plants, comprising:
   at least one growing cup filled with a non-soil growing bed substrate;
   at least one dry tube attached to a bottom side of said at least one growing cup, said at least one dry tube is submerged in a nutrient solution contained in a container, said at least one dry tube isolates roots of at least one plant planted in said at least one growing cup from said nutrient solution;
   at least one water pump adapted to drive a sprinkle of said nutrient solution through at least one water pipe into said at least one growing cup, said sprinkle flows over said roots, a residue of said sprinkle flows from at least one hole located at said bottom side and through said at least one dry tube to be accumulated at the bottom of said at least one dry tube;
   at least one sensor adapted to capture at least one growth parameter indicative of at least one growth condition of said at least one plant;
   a communication component adapted to communicate with at least one remote device via at least one network; and
   a controller coupled to said communication component, said controller is adapted to operate said at least one water pump according to at least one growth directive received from said at least one remote device, said at least one remote device generates said at least one growth directive based on an analysis of said at least one growth parameter received from said controller.

2. The hydrophonic planter of claim 1, wherein said nutrient solution is a mixture of water and at least one fertilization material.

3. The hydrophonic planter of claim 1, wherein said at least one plant is planted in said non-soil growing bed substrate in a form selected from a group consisting of: seed, root, bulb, bulbet, tuber, shoot, seedling, and plant.

4. The hydrophonic planter of claim 1, wherein said at least one water pump is adapted to draw said residue out of said at least one dry tube back into said container.

5. The hydrophonic planter of claim 1, wherein said at least one dry tube is at least partially submerged in said nutrient solution.

6. The hydrophonic planter of claim 1, wherein said at least one growing cup, said at least one dry tube, said at least one water pump, said at least one sensor, said controller and said communication component are mechanically coupled together in a modular structure insertable into said container.

7. The hydrophonic planter of claim 1, wherein said at least one growing cup, said at least one dry tube, said at least one water pump, said at least one sensor, said controller and said communication component are integrated with said container.

8. The hydrophonic planter of claim 7, wherein said container is adapted to mechanically fit into a planter outer case.

9. The hydrophonic planter of claim 1, wherein said at least one growth parameter is a member of a group consisting of: nutrient solution level, nutrient solution pH, nutrient solution conductivity, nutrient solution temperature, nutrient solution murkiness, light exposure, and light spectrum.

10. The hydrophonic planter of claim 1, further comprising said controller transmits operational status data to said at least one remote device.

11. The hydrophonic planter of claim 1, further comprising said at least one growing cup, said at least one dry tube, said at least one water pump, said at least one sensor, said controller and said communication component are integrated in a modular internal construction which is pluggable into said container.

12. The hydrophonic planter of claim 1, further comprising at least one visual interface controlled by said controller to provide at least one visual indication to a user,
   wherein said visual indication comprises at least one of:
       an indication of a state of at least growth parameter and
       an indication of at least one operational parameter of said hydrophonic planter, and
   wherein said visual interface includes at least one member of a group consisting of: an indication light and a display.

13. The hydrophonic planter of claim 1, further comprising at least one mechanical support component mechanically coupled to said container to support said at least one plant.

14. The hydrophonic planter of claim 1, further comprising a grow lamp mechanically coupled to said container and controlled by said controller, said grow lamp illuminates said at least one plant with at least a portion of a light spectrum.

\* \* \* \* \*